Patented May 30, 1939

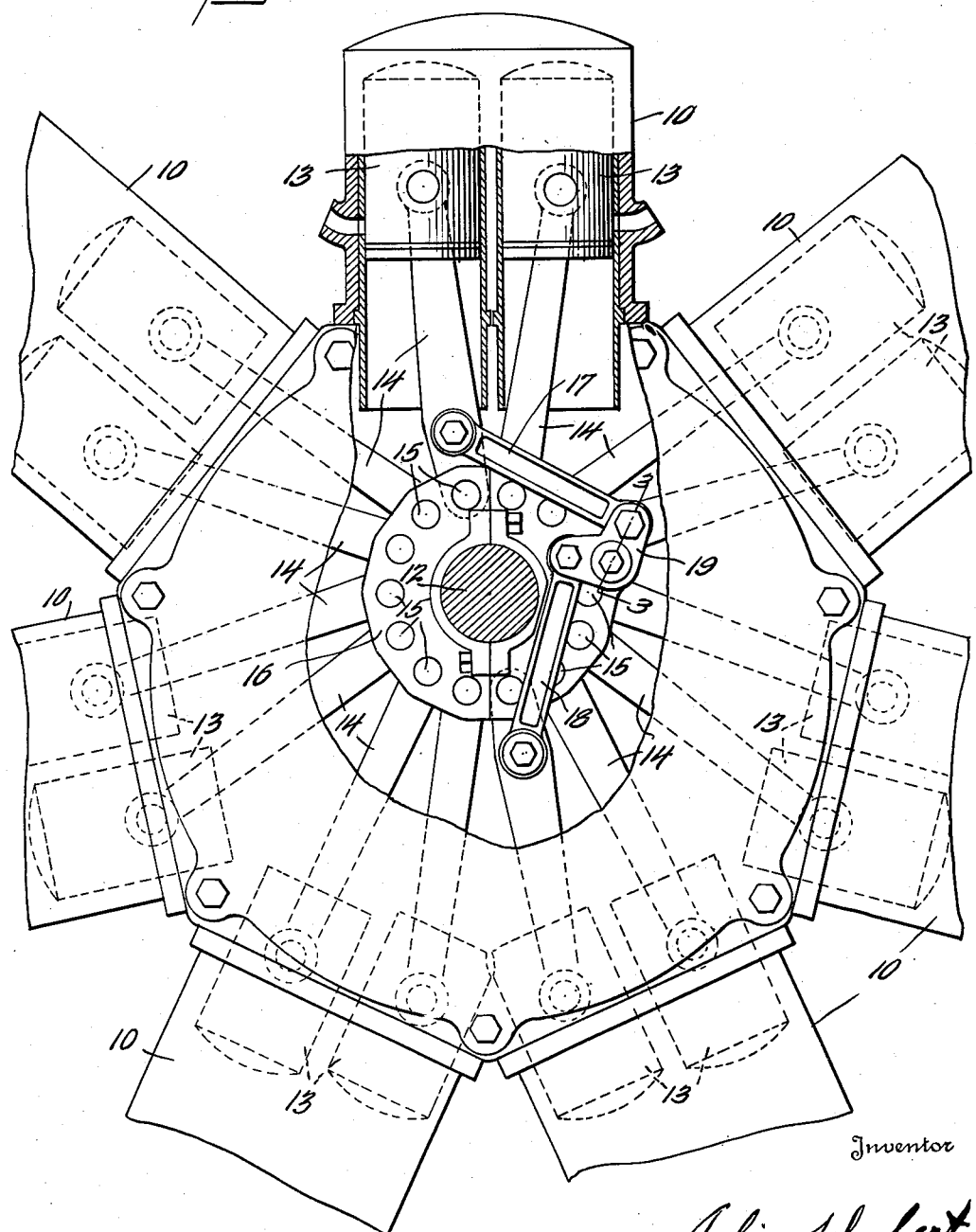

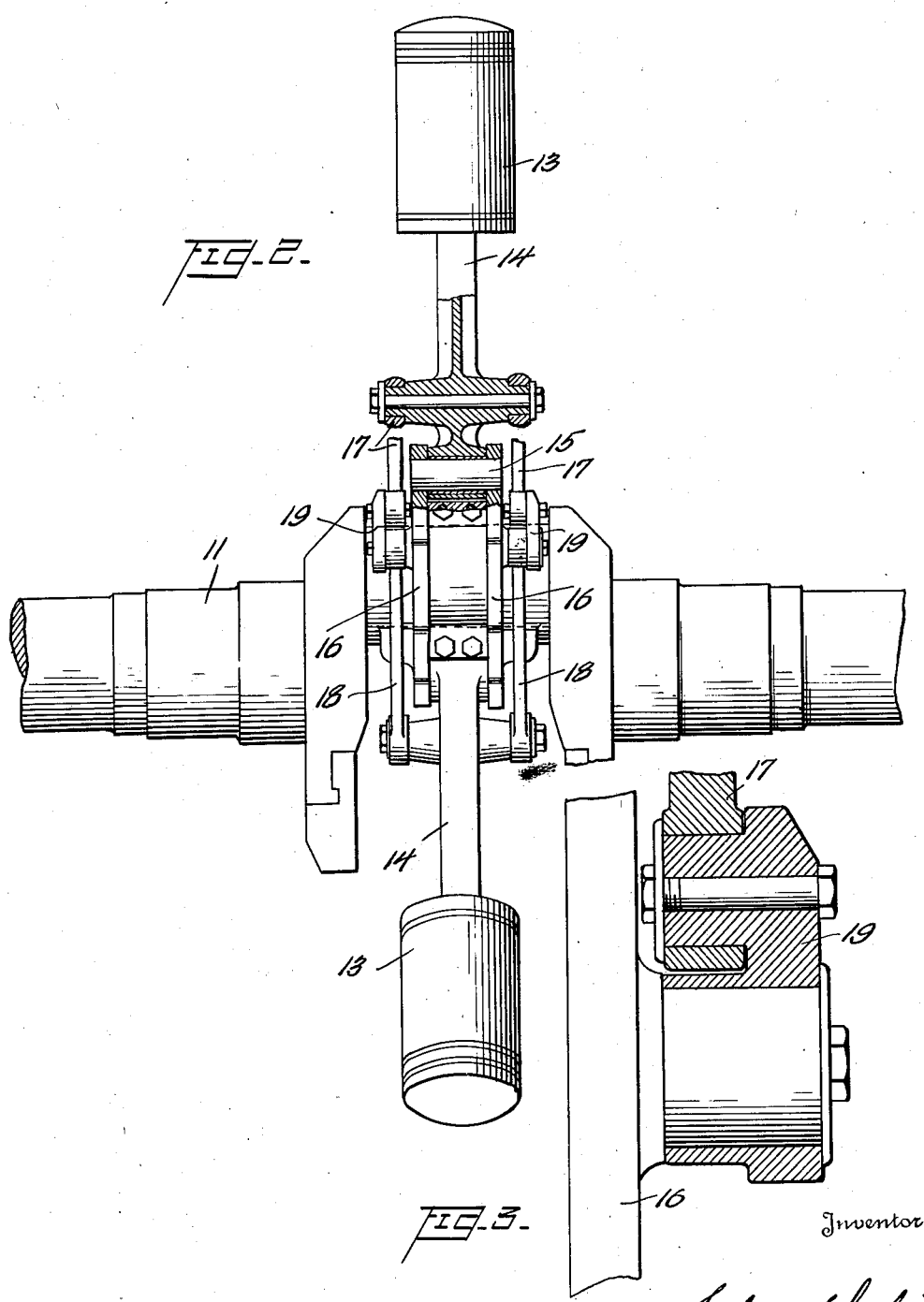

2,160,444

UNITED STATES PATENT OFFICE 2,160,444

CONNECTING ROD ASSEMBLY FOR RADIAL ENGINES

Julius Schubert, Sunnyside, N. Y.

Application June 8, 1938, Serial No. 212,574

2 Claims. (Cl. 74—580)

This invention relates to a true motion connecting rod assembly for radial internal combustion engines and, among other objects, aims to provide a greatly improved connecting rod hub mounting for the connecting rods and link and lever connections between the hub and the connecting rods arranged to maintain the hub in a definite or predetermined angular position relative to the various cylinders during the rotation of the crank shaft. Another aim is to provide a simple connecting rod assembly having a true motion permitting the development of unlimited horsepower in a single or multiple row radial engines.

Other objects of the invention will appear in the specification, when considered in connection with the accompanying drawings, wherein:

Fig. 1 is a front view, partly in section, showing the preferred form of connecting rod assembly applied to a radial engine;

Fig. 2 is a vertical view, partly in section, showing two of the connecting rods applied to a crank pin;

Fig. 3 is a fragmentary sectional view taken on the line 3—3 of Fig. 1.

Referring to the drawings, the engine is shown as having one row of radial cylinders 10 of which there may be any desired number. The engine has the usual crankshaft 11 with a crank pin 12. The pistons 13 have the usual articulating or connecting rods 14 each connected to a bearing pin 15 in a hub member 16 on the crank pin 12. The hub member 16 is shown as being split or made in two parts bolted together on the crank pin 12. To keep the hub in the same relative angular position during the rotation of the crank, separate pairs of links 17 and 18 are shown as being pivotally connected at their outer ends to opposite articulating rods near the hub. These links are connected at their other ends to the arms of a bell-crank 19 which is pivoted at the junction of the arms to the hub approximately 90° from the articulating rods. The arrangement is such that as the crank turns, the links act to prevent the hub from rotating on the crank pin, causing it to remain in the same relative angular position, the bell-crank compensating for the angular displacement or movements of the inner end portions of the connecting rods.

I claim:

1. A connecting rod assembly for radial engines comprising, in combination, a hub carrying a plurality of articulating rods; separate links each pivoted at one end to substantially opposed articulating rods; and a bell-crank pivoted on the hub having arms pivotally connected to the other ends of said links arranged to maintain the hub always in the same relative angular position.

2. A connecting rod assembly for radial engines comprising, in combination, a hub carrying a plurality of articulating rods; a bell-crank member pivoted at the junction of its arms to the hub; and a pair of links pivotally connected to the respective arms of the bell-crank and to separate articulating rods to maintain the hub always in substantially the same angular position.

JULIUS SCHUBERT.